US009039276B2

(12) United States Patent
Fujikawa

(10) Patent No.: US 9,039,276 B2
(45) Date of Patent: May 26, 2015

(54) TEMPERATURE DETECTING DEVICE, ELECTRO-OPTIC DEVICE AND ELECTRONIC APPARATUS

(75) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 624 days.

(21) Appl. No.: 13/344,411

(22) Filed: Jan. 5, 2012

(65) Prior Publication Data

US 2012/0183011 A1 Jul. 19, 2012

(30) Foreign Application Priority Data

Jan. 13, 2011 (JP) ................... 2011-004592

(51) Int. Cl.
G01K 3/04 (2006.01)
G01K 7/01 (2006.01)
G01K 11/12 (2006.01)
G01K 13/00 (2006.01)
G01K 7/16 (2006.01)
G09G 3/36 (2006.01)
G09G 3/00 (2006.01)
H04N 9/31 (2006.01)

(52) U.S. Cl.
CPC ........ *G01K 13/00* (2013.01); *G01K 7/16* (2013.01); *G09G 3/3611* (2013.01); *G09G 2320/041* (2013.01); *G09G 3/002* (2013.01); *G09G 3/3614* (2013.01); *G09G 2320/0204* (2013.01); *H04N 9/3144* (2013.01); *H04N 9/3155* (2013.01); *H04N 9/3194* (2013.01)

(58) Field of Classification Search
CPC ....... G01J 5/20; G01J 5/08; G01J 2005/0077; G01J 2005/0048; G01J 5/522; G01J 5/0003; G01J 5/0014

USPC ........ 250/316.1, 338.1, 338.3, 338.4, 339.02, 250/339.04, 341.5; 374/101, 102, 103, 104, 374/141, 120, 121, 124, 129, 134, 166, 167, 374/170, 1, 130, 132, 161; 702/99, 130, 702/136; 348/14.07; 353/52; 345/204, 690, 345/691; 257/43; 359/245

See application file for complete search history.

(56) References Cited

U.S. PATENT DOCUMENTS 6,267,501 B1 * 7/2001 Wand et al. .................... 374/124
7,718,966 B2 * 5/2010 Ueno ......................... 250/338.4

(Continued)

FOREIGN PATENT DOCUMENTS

DE  60032220    * 1/2007
JP  09-005713 A  1/1997

(Continued)

*Primary Examiner* — Gail Kaplan Verbitsky
(74) *Attorney, Agent, or Firm* — Maschoff Brennan

(57) ABSTRACT

A control unit sets a time interval for measuring a temperature of a liquid crystal panel as a first time interval (1 second), and thereafter measures the temperature of the liquid crystal panel each time the first time interval elapses. When the temperature of the liquid crystal panel is stabilized, the control unit sets a time interval for measuring the temperature of the liquid crystal panel as a second time interval (5 seconds). The control unit measures the temperature of the liquid crystal panel each time the second time interval elapses. Moreover, if an operation to change the amount of light reaching the liquid crystal panel is performed, the control unit restores the time interval for measuring the temperature of the liquid crystal panel to the first time interval.

4 Claims, 13 Drawing Sheets

(56) References Cited

U.S. PATENT DOCUMENTS

| | | | |
|---|---|---|---|
| 2004/0218129 A1* | 11/2004 | Mochizuki | 349/139 |
| 2005/0094434 A1 | 5/2005 | Watanabe et al. | |
| 2011/0175883 A1* | 7/2011 | Toyotaka et al. | 345/211 |
| 2011/0221931 A1* | 9/2011 | Wakabayashi et al. | 348/229.1 |
| 2013/0083086 A1* | 4/2013 | Nose | 345/690 |
| 2014/0104155 A1* | 4/2014 | Long et al. | 345/107 |

FOREIGN PATENT DOCUMENTS

| | | |
|---|---|---|
| JP | 2005-142289 A | 6/2005 |
| JP | 2008-256821 A | 10/2008 |

* cited by examiner (OBSERVATION SIDE)

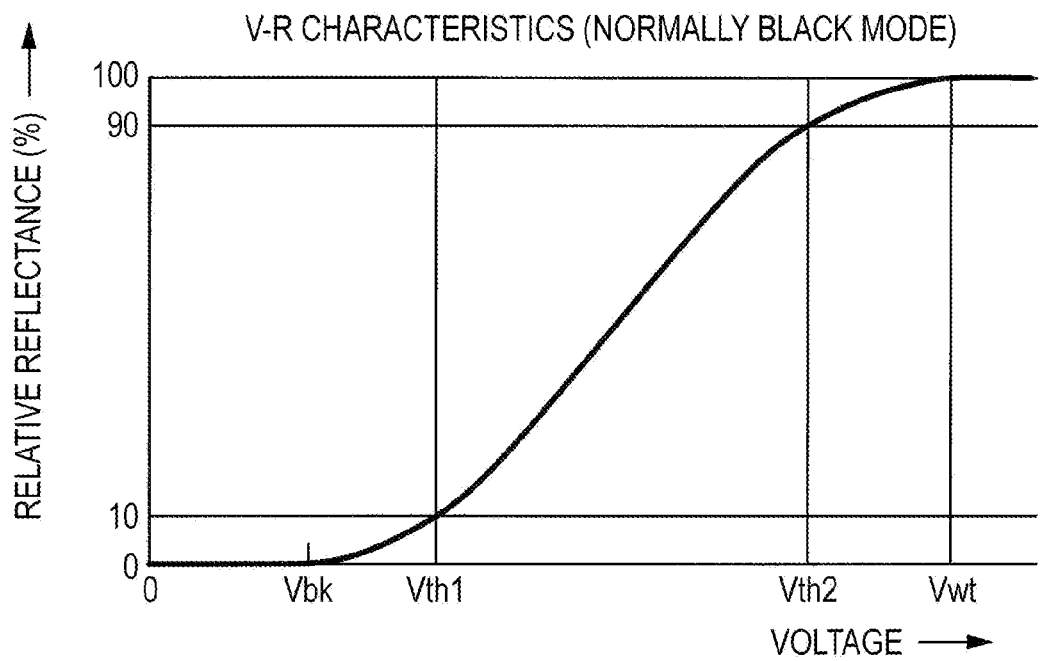

TEMPERATURE DETECTING DEVICE, ELECTRO-OPTIC DEVICE AND ELECTRONIC APPARATUS

BACKGROUND

1. Technical Field

The present invention relates to a technology of detecting temperature.

2. Related Art

In liquid crystal elements in a liquid crystal panel, even if the same voltage is applied to the liquid crystal, gradation varies depending on the temperature of the liquid crystals. Because of this, such technologies have been proposed as to detect the temperature in a liquid crystal panel and perform various controls depending on the detected temperature. For example, in a display device disclosed in one example of related art, JP-A-2008-256821, a pixel with a temperature sensor added within liquid crystal is provided at the center of the display surface, and a drive substrate cooling mechanism of the liquid crystal is controlled based on the temperature detected by the temperature sensor. Moreover, in a liquid crystal display device disclosed in another example of related art, JP-A-9-5713, a pattern of transparent electrodes is formed to surround the periphery of scanning electrodes aligned on a display panel, and a driving voltage is controlled according to the resistance value of the pattern.

In a liquid crystal panel, aluminum is used as wiring material. Due to increasingly high definition in display panels, the line width of aluminum wiring has become narrower. However, if temperature measurement is performed while a current is constantly fed to a temperature sensor for measuring temperature, electromigration could occur in the wiring leading to the temperature sensor, and there is a concern that the wiring be broken.

SUMMARY

An advantage of some aspects of the invention is to improve the reliability of resistant wiring in the wiring used for temperature measurement.

According to an aspect of the invention, there is provided a temperature detection device including a measurement unit for measuring a temperature by applying, at a set time interval, a signal for actuating a temperature sensor to the wiring and the temperature sensor through the wiring, the temperature sensor being electrically connected to the wiring. The temperature detection device further includes a first setting unit for setting the time interval to a second time interval which is longer than the first time interval if the difference between the last measured temperature and the temperature measured before the last measured temperature is less than the first threshold value, when the measurement unit measures the temperature at a first time interval, and a second setting unit for setting a time interval to the first time interval if an amount of incident light from a light source is changed, when the measurement unit measures a temperature at a second time interval.

According to such a configuration, if the difference between the last measured temperature and the temperature measured before the last measured temperature, that is to say the temperature change, decreases to be less than in amount than a threshold value, the time interval for measuring the temperature becomes the longer second time interval. If the time interval for measuring a temperature becomes longer, the frequency of applying a signal to the temperature sensor decreases. As a result, the current flowing through the wiring, which applies a signal to the temperature sensor, may be reduced, thereby improving the reliability of the resistant wiring.

Further, according to another aspect of the invention, there is provided an electro-optic device including a temperature sensor formed of a plurality of dummy pixel electrodes electrically interconnected to each other on the outside of the display region for displaying an image, a measurement unit for measuring the temperature by applying, at a set time interval, a signal for actuating the temperature sensor to the temperature sensor through the wiring, a first setting unit for setting the time interval to a second time interval which is longer than the first time interval, if the difference between the last measured temperature and a temperature measured before the last measured temperature is less than a first threshold value, when the measurement unit measures a temperature at a first time interval, and a second setting unit for setting a time interval to the first time interval, if an amount of incident light from a light source is changed, when the measurement unit measures a temperature at a second time interval.

According to such a configuration, if the difference between the last measured temperature and the temperature measured before the last measured temperature, namely the temperature change, decreases to be less than a threshold value in amount, the time interval for measuring a temperature becomes the longer second time interval. If the time interval for measuring a temperature becomes longer, the frequency of applying a signal to the temperature sensor decreases. As a result, the current flowing through the wiring to apply a signal to the temperature sensor may be reduced, thereby improving the reliability of the resistant wiring.

Moreover, when an amount of incident light to the electro-optic device is changed, the temperature of the electro-optic device changes, but the time interval for measuring the temperature is changed to the first time interval in response to the change of the amount of incident light to the electro-optic device. As a result, the difference between the measurement result and the temperature of the electro-optic device will not increase.

In the aforementioned configuration, when the measurement unit measures a temperature at the second time interval, if the difference between the last measured temperature and the temperature measured before the last measured temperature is less than the second threshold value which is lower than the first threshold value, a configuration may be employed having a third setting unit for setting the third time interval to a third time interval which is longer than the second time interval.

According to such a configuration, the time interval for temperature measurement increases to be further longer than the second time interval. If the time interval for temperature measurement becomes longer, the frequency of applying a signal to the temperature sensor decreases. As a result, the current flowing through the wiring to apply a signal to the temperature sensor may be reduced, thereby improving the reliability of the wiring.

Moreover, in addition to the electro-optic device, the invention may also include an electronic apparatus including therein the electro-optic device of the invention.

BRIEF DESCRIPTION OF THE DRAWINGS

The invention will be described with reference to the accompanying drawings, wherein like numbers reference like elements.

FIG. 7 is a diagram illustrating a relationship between an applied voltage applied and a reflectance of the liquid crystal element.

FIG. 8 is a diagram showing the contents of a table TB1.

DESCRIPTION OF EXEMPLARY EMBODIMENTS

First Embodiment

Hereinafter, the first embodiment of the invention will be described. To begin with, the configuration of a liquid crystal panel, which is a display panel for displaying an image and the electro-optic device according to the invention, will be schematically explained. The liquid crystal panel according to the first embodiment is a reflection type, and is used as a light valve of a projector to be described below.

Figure 1A:
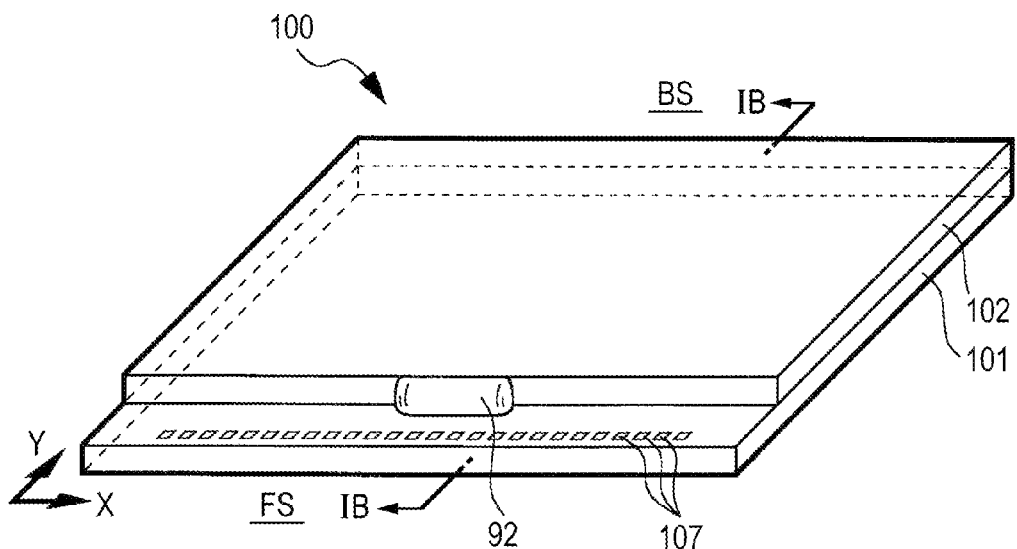
FIG. 1A and FIG. 1B illustrate a liquid crystal panel according to the embodiments.
Figure 1B:
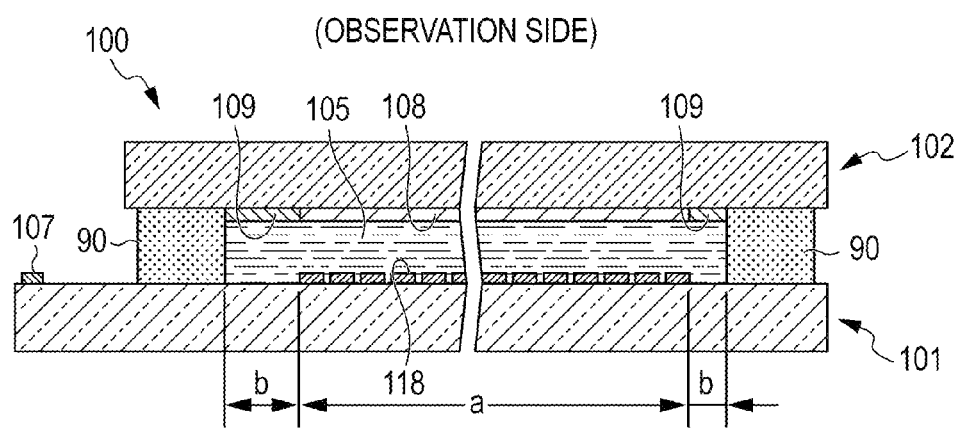

FIG. 1A is a perspective view illustrating a configuration of a liquid crystal panel 100 according to the embodiment, and FIG. 1B is a cross-sectional view cut along line IB-IB of FIG. 1A. In the drawings, each layer, each member, each region may be illustrated at a different scale from the real scale in order to depict them at a recognizable size. As illustrated in these drawings, the liquid crystal panel 100 is configured by including a element substrate 101 formed with pixel electrodes 118, an opposed substrate 102 provided with a common electrode 108, and a seal material 90 containing a spacer (not shown). The element substrate 101 and the opposed substrate 102 are joined to each other by the seal material so that the respective electrode-formed faces opposed each other with a regular gap maintained therebetween. A liquid crystal 105 of VA (Vertical Alignment) type, for example, is enclosed in this gap.

According to the embodiment, a light-permeable substrate such as a glass or quartz substrate is used for the element substrate 101 and the opposed substrate 102 respectively. In FIG. 1A, the element substrate 101 is longer than the opposed substrate 102 in the Y direction. However, since these substrates are joined together with the back side (BS side) in a state of alignment, and one side of the front side (FS side) of the element substrate 101 protrudes from the opposed substrate 102. A plurality of terminals 107 are provided on this protruded region along the X direction. Furthermore, the plurality of terminals 107 are connected to the FPC (Flexible Printed Circuits) substrates so as to receive each kind of signal and each voltage as well as a video signal from external higher-level devices.

Although the details will be later described, each of the pixel electrodes 118 formed on the element substrate 101 on the face opposed to the opposed substrate 102 is a patterned reflective metal layer of aluminum or the like. The common electrode 108 formed on the opposed substrate 102 on the face opposed to the element substrate 101 is a transparent electrically conductive layer of ITO (Indium Tin Oxide) or the like. Further, a light-blocking layer 109 made of a light blocking material is arranged on the opposed substrate 102 to surround the periphery of the common electrode 108.

The seal material 90 is formed along the edge of the opposed substrate 102 in a frame-like configuration, and part of the seal material 90 is opened in order to enclose the liquid crystal 105. Because of this, after the liquid crystal 105 is enclosed, the opening is sealed with a sealant 92. In addition, the face of the element substrate 101 opposing the opposed substrate 102 and the face of the opposed substrate 102 opposing the element substrate 101 are respectively provided with an alignment film for aligning, in a state where no voltage is applied, liquid crystal molecules along the normal line of the substrates. However, FIG. 1B omits the illustration regarding this point.

Figure 2:
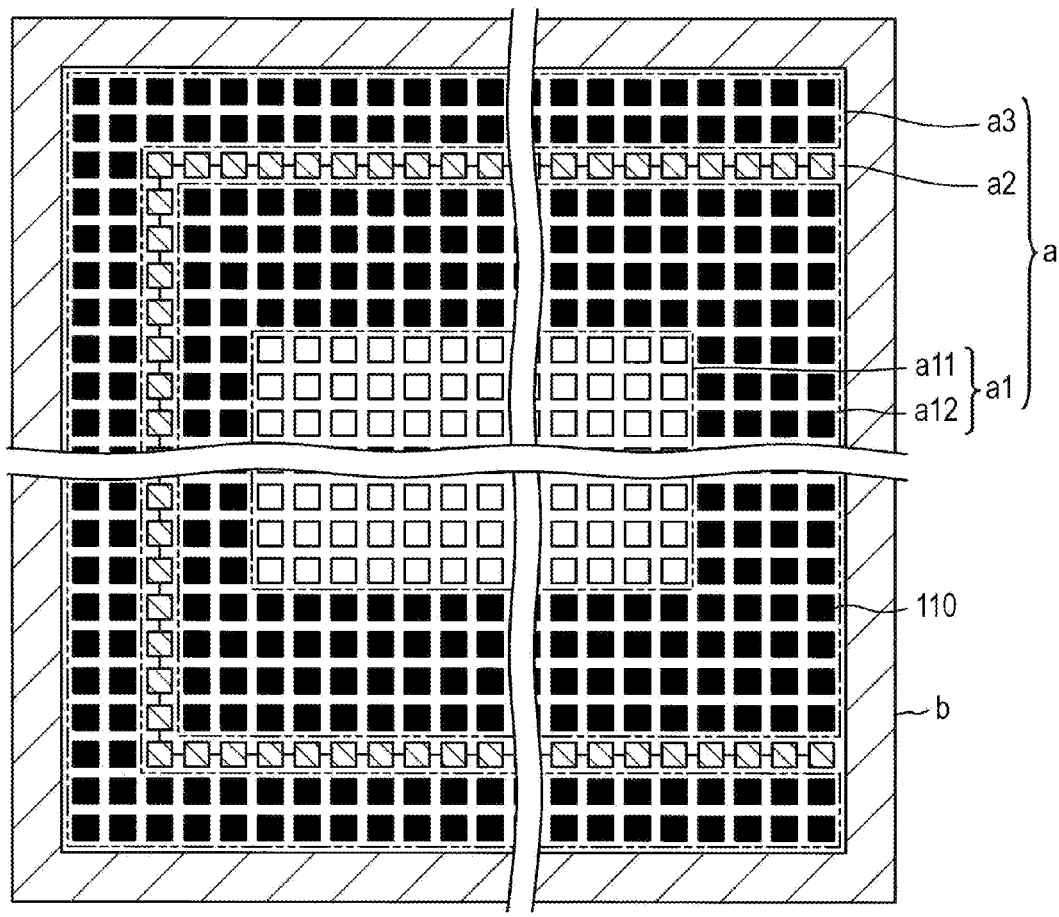
FIG. 2 is a diagram illustrating regions formed in the liquid crystal panel.

Next, regions of the element substrate 101 denoted by a and b in FIG. 1B will be explained with reference to FIG. 2. FIG. 2 is a diagram schematically illustrating a positional relation of the regions a and b in a plan view of the liquid crystal panel 100 as seen from above in FIG. 1A, that is to say from the opposed substrate 102 side. In FIG. 2, the region b is the region of the light-blocking layer 109. Incident lights from the opposed substrate 102 side to the liquid crystal panel 100 are blocked by the light-blocking layer 109 in the region b, and allowed to pass through the opposed substrate 102 in the region a. In FIG. 2, the region a is a region where the pixels 110 are aligned in a matrix shape, which includes regions a1 to a3. In FIG. 2, the pixels 110 in the region a2 are hatched so as to make it easier to differentiate the pixels 110 in the region a2 from the pixels 110 in the other regions.

The region a1 is a region which displays an image and a black frame. The region a1 includes a region a11 where the pixels 110 are aligned in a plurality of rows and a plurality of columns in a matrix shape, and a region a12 where the pixels 110 are aligned along the outer periphery of the region a11. The region a11 is an effective display region to display an image. On the other hand, the region a12 is a region (first region) to display black, and is visually recognized as black in a similar manner to the light-blocking layer 109.

The region a2 is a region (second region) to display black. The region a2 is configured by including a plurality of pixels 110 aligned along two sides extending along the X direction of the region a12 on the outer side of the region a12, and a plurality of pixels 110 aligned along one side extending along the Y direction of the region a12 on the outer side of the region a12. Here, the pixels 110 in the region a2 are so arranged that the pixel electrodes 118 of the adjoining pixels 110 are connected to each other by a wiring not shown. That is to say, the pixel electrodes 118 in the region a2 are connected in series and function as a single resistor R.

The region a3 is a region to display black. The region a3 is configured by including a plurality of pixels 110 aligned along two sides extending along the X direction of the region a2 on the outer side of the region a2, and a plurality of pixels 110 aligned along one side extending along the Y direction of the region a2 on the outer side of the region a2. The region a3 is visually recognized as a black frame in the same manner as the light-blocking layer 109.

That is to say, according to the first embodiment, the region a12, the region a2, the region a3 and the region b, that display black respectively, are arranged on the outer side of the region a11 which becomes the effective display region, and the region a12, the region a2, the region a3 and the region b are visually recognized as black frame respectively on the outer side of the effective display region as illustrated in FIG. 2. The pixels contained in these regions function as dummy pixels provided with dummy pixel electrodes respectively.

Next, the electrical configuration of the liquid crystal panel 100 will be described with reference to FIG. 3. As mentioned above, the liquid crystal panel 100 is configured such that the element substrate 101 and the opposed substrate 102 are joined to each other with a regular gap maintained therebetween, and a liquid crystal 105 is held in this gap. The element substrate 101 is configured such that a plurality of scanning lines 112 are arranged in m rows along the X direction, in the drawing, on the face opposing the opposed substrate 102, whereas a plurality of data lines 114 are arranged in n columns along the Y direction in an electrically isolated state from the scanning lines 112.

In the region a of the element substrate 101, a set of a n-channel type TFT 116, as an example of a switching element, and the pixel electrode 118 having reflectivity is arranged corresponding to each intersection of the scanning lines 112 in m rows and the data lines 114 in n columns. The TFT 116 has a gate electrode connected to the scanning line 112, a source electrode connected to the data line 114, and a drain electrode connected to the pixel electrode 118. For this reason, according to the first embodiment, the pixel electrodes 118 are aligned in m rows and n columns in a matrix shape in the region a.

Figure 3:
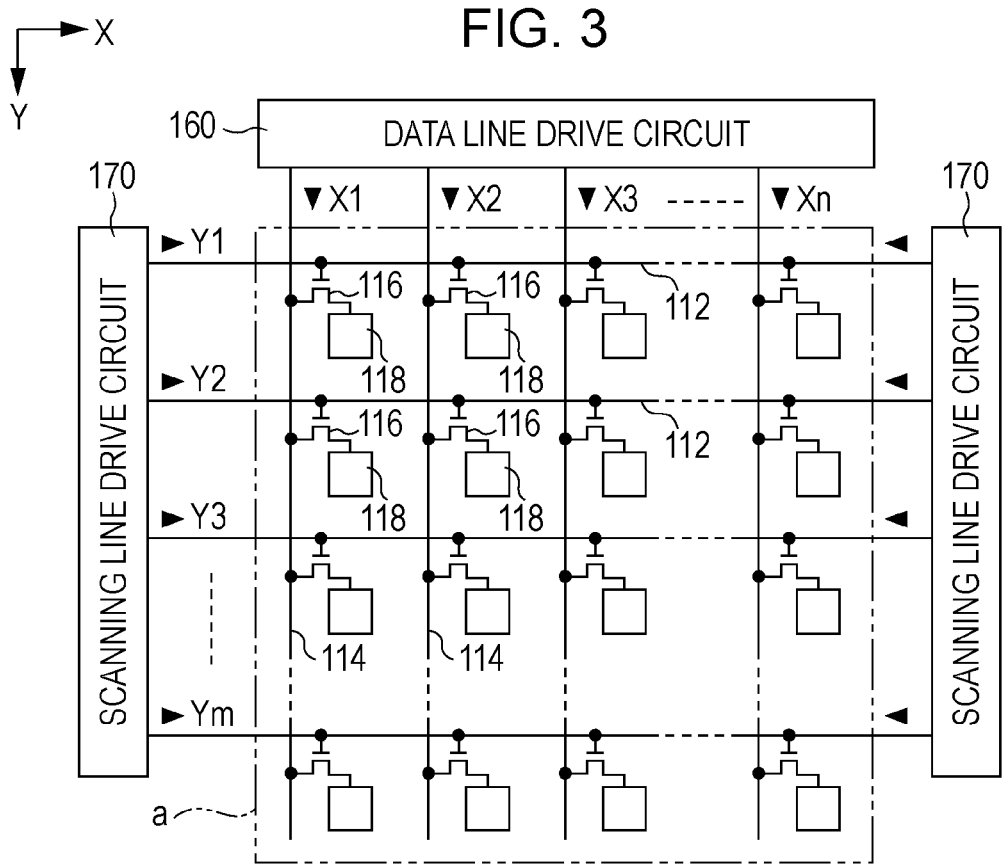
FIG. 3 is a diagram illustrating a circuit configuration of the liquid crystal panel.

Here, according to the first embodiment, for differentiation, the data lines 114 may be referred to as the 1st, 2nd, 3rd, . . . , (n−1)-th and n-th columns in order from the left in FIG. 3. Similarly, for differentiation, the scanning lines 112 may be referred to as the 1st, 2nd, 3rd, . . . , (m−1)-th and m-th rows in order from the top in FIG. 3.

A data line driving circuit 160 drives the data lines 114 in the 1st, 2nd, 3rd, . . . , and n-th columns. To be more specific, the data line driving circuit 160 distributes a video signal supplied through the terminals 107 to the data lines 114 in the 1st, 2nd, 3rd, . . . , and n-th columns and maintains the video signal at the data lines 114, by means of various kinds of control signals also supplied through the terminal 107, and thereafter, supplies the maintained signal as data signals X1, X2, X3, . . . , and Xn. Here, as illustrated in FIG. 3, the data line driving circuit 160 is arranged in a region adjacent to one side along the X direction in region a.

Two scanning line driving circuits 170 drive the scanning lines 112 in the 1st, 2nd, 3rd, . . . , and m-th rows from both sides. More specifically, the scanning line driving circuits 170 respectively generate scanning signals Y1, Y2, Y3 . . . , and Ym by means of various kinds of control signals supplied through the terminals 107, and supply the generated signals to the scanning lines 112 in the 1st, 2nd, 3rd, . . . , and m-th rows from both sides. As illustrated in FIG. 3, the scanning line driving circuits 170 are respectively arranged in regions adjacent to the two sides along the Y direction in region a.

On the other hand, among the opposed substrates 102, the common electrode 108 having transparency is arranged on the face of the element substrate 101, to be more precise, the face opposing the region a. The common electrode 108 has a voltage LCcom applied thereto through the terminals 107 and the wiring not shown.

Figure 4:
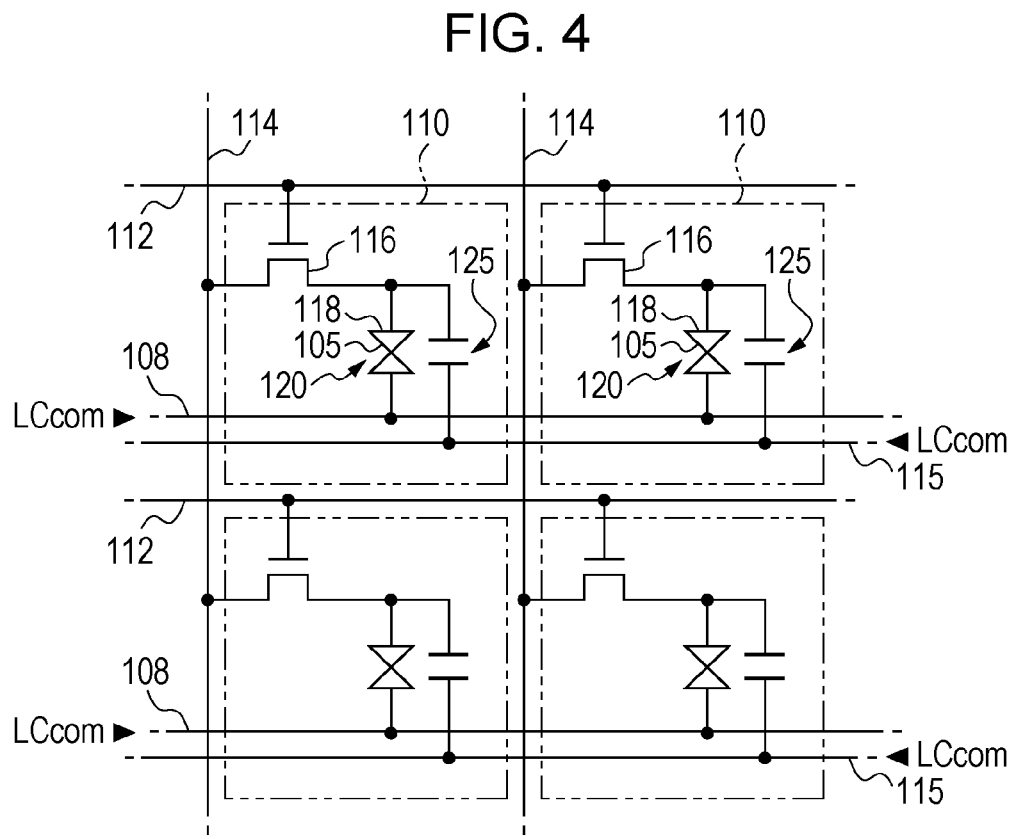
FIG. 4 is a diagram illustrating an equivalent circuit of a pixel in the liquid crystal panel.

FIG. 4 illustrates equivalent circuits of the pixels 110 in the region a, wherein liquid crystal elements 120 are aligned, each of which is configured to hold the liquid crystal 105 by the pixel electrode 118 and the common electrode 108 corresponding to each intersection of the scanning lines 112 and the data lines 114. In spite of omission in FIG. 3, as actually illustrated in FIG. 4, an auxiliary capacitor (storage capacitor) 125 is provided in parallel to the liquid crystal element 120. This auxiliary capacitor 125 is connected at one end to the pixel electrode 118 and common-connected at the other end to a capacitor line 115. According to the first embodiment, the same voltage LCcom that is applied to the common electrode 108 is applied to the capacitor line 115.

In such a configuration, when the scanning line driving circuit 170 selects a scanning line in a certain one row to cause the scanning line 112 to reach an H level, the TFT 116 connected at its gate electrode to the scanning line is turned on, and the pixel electrode 118 is electrically connected to the data line 114. For this reason, if the data line driving circuit 160 supplies a data signal corresponding to gradation to the data line 114, when the scanning line 112 is at the H level, the data signal is applied to the pixel electrode 118 through the on-state TFT 116. If the scanning line 112 reaches an L level, the TFT 116 is turned off, but the voltage applied to the pixel electrode is sustained by the capacitative property of the liquid crystal element 120 and the auxiliary capacitor 125.

The scanning line driving circuit 170 selects scanning lines 112 from the first to the m-th rows in order, and the data line driving circuit 160 supplies a data signal for one row worth pixels positioned in the selected scanning lines 112 through the data line 114. Consequently, a voltage corresponding to gradation is applied to and sustained in every liquid crystal element 120. This procedure is repeated for each frame (one vertical scanning period).

In the liquid crystal element 120, according to the strength of an electric field generated between the pixel electrode 118 and the common electrode 108, the molecular orientation state of the liquid crystal 105 changes. Here, in order to prevent deterioration of the liquid crystal 105 caused by application of direct-current components, alternating-current driving is implemented in regard to the liquid crystal element 120. In addition, according to this embodiment, the alternating-current driving is of a face-reversing style in which all the writing polarities of the respective liquid crystal elements 120 are made to be the same within the same frame.

In FIG. 1A, incident light from the top of the opposed substrate 102 follows a route from a light polarizer not shown, through the opposed substrate 102, the common electrode 108, and to the liquid crystal 105, and thereafter is caused to reflect by the pixel electrodes 118 and exits through a route opposite to the route of the incident light. At this time, the ratio of the amount of exiting light to the amount of incident light to the liquid crystal element 120, that is to say the reflectance, increases accordingly as the voltage applied to and sustained by the liquid crystal element 120 increases.

Thus, the reflectance varies among the respective liquid crystal elements 120 in the liquid crystal panel 100, whereby each of the liquid crystal elements 120 functions as a pixel which is the smallest unit of an image to be displayed. The liquid crystal elements 120 are defined by the pixel electrodes 118 in a top plan view thereof, therefore the region of the aligned pixel electrodes 118 corresponds to the aforementioned region a.

Figure 5:
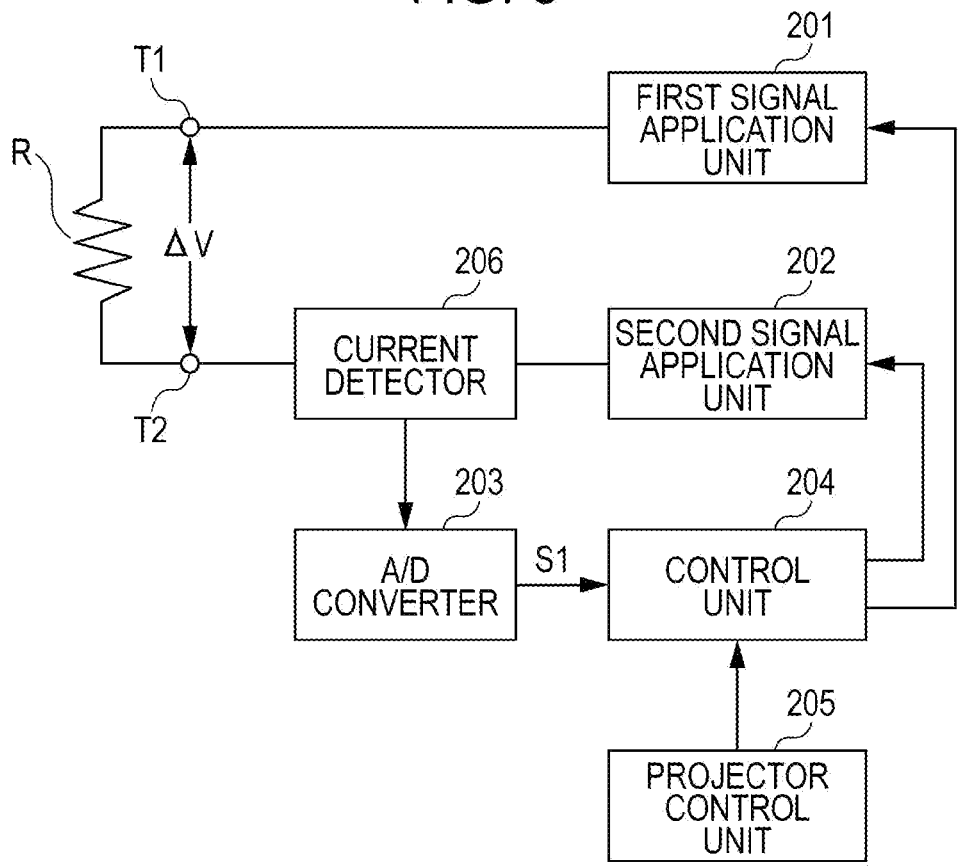
FIG. 5 is a diagram illustrating a configuration of a hardware for measuring the temperature of a liquid crystal element.
Figure 6:
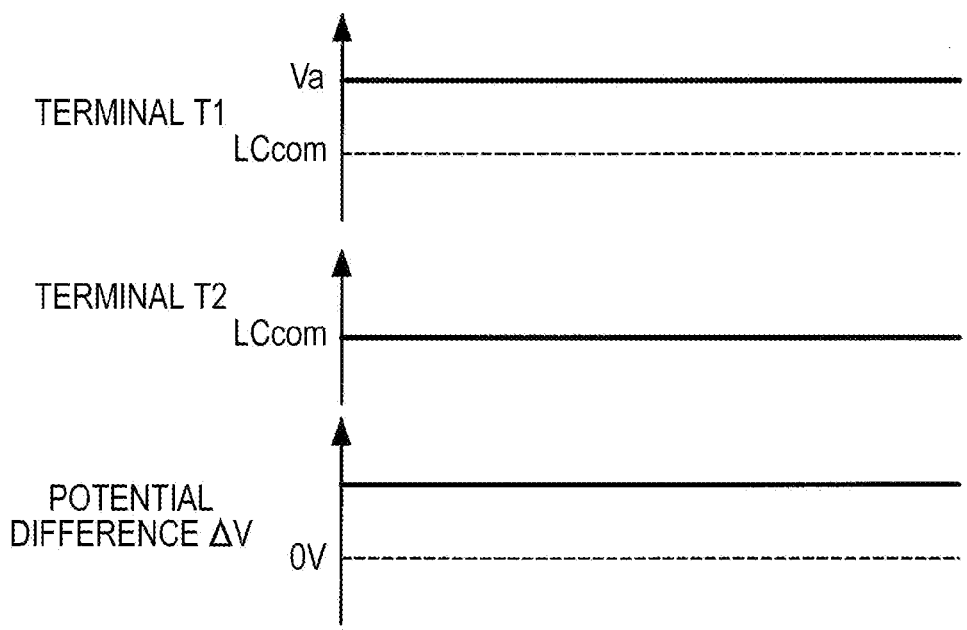
FIG. 6 is a diagram illustrating a voltage applied to a pixel electrode for temperature measurement.

Next, the configuration of measuring the temperature of the liquid crystal elements 120 will be described. FIG. 5 illustrates the configuration of hardware for measuring the temperature of the liquid crystal elements 120. As mentioned above, the pixel electrodes 118 in the region a2 are connected in series by the metal wiring arranged on the element substrate 101, and function as a single resistor R. The resistor R is connected to a terminal T1 at one end and connected to a terminal T2 at the other end. A first signal application unit 201 is adapted to apply a predetermined signal (first signal) to the terminal T1, and connected to the terminal T1 by the metal wiring arranged on the element substrate 101. A second signal application unit 202 is adopted to apply a predetermined signal (second signal) to the terminal T2, and connected to the terminal T2 by the metal wiring arranged on the element substrate 101. According to the first embodiment, as illustrated in FIG. 6, when the temperature of the liquid crystal elements 120 is measured, a signal of a constant voltage L Ccom is applied to the terminal T2, and a signal of the constant voltage L Ccom+a voltage Va is applied to the terminal T1. In addition, when the temperature of the liquid crystal elements 120 is not measured, the voltage L Ccom is applied to both the terminals T1 and T2.

According to the first embodiment, in the relationship between the application voltage (V) and the reflectance (R) of the liquid crystal element 120, the liquid crystal 105 is defined as normally black mode of the VA (vertical alignment) mode, which is represented by the V (voltage)–R (reflectance) characteristics as shown in FIG. 7. The region a2 is adopted to display black, and therefore the voltage applied to the liquid crystal elements 120 in the region a2 is set to be lower than a voltage Vbk which is the voltage to render the liquid crystal element 120 in the region a2 to be at a black level of the normally black mode. As show in FIG. 7, the VA mode has a sufficient saturated region on the black level side. According to this embodiment, in order for the temperature measurement, a voltage is applied between the terminals each formed as a resistor R having temperature dependency. As a result, even if a voltage of several V, lower in voltage than voltage Vbk, is applied to the liquid crystal layer, the effect on the black display is difficult to visually recognize.

Further, a current detector 206 detects a current flowing through the resistor R, and is connected in series to the resistor R. Furthermore, the output of the current detector 206 is connected to an A/D converter 203, and the current detector 206 outputs a signal (current value I) representing a current value of the detected current to the A/D converter 203. The A/D converter 203 converts the current value I to a digital signal, and outputs the signal S1 representing the current value I to a control unit 204.

The control unit 204 is a micro computer which includes a CPU (Central Processing Unit), a ROM (Read Only Memory) and a RAM (Random Access Memory), and performs operations according to the program stored in the ROM.

The control unit 204 acquires a signal S1 supplied from the A/D converter 203, and obtains a current value I from the acquired signal S1. Also, the control unit 204 stores therein a table TB1 (FIG. 8) representing the relationship between the current value I and the temperature of the resistor R. The resistance value of the resistor R varies according to the temperature of the resistor R, and the current value I varies according to the resistance value of the resistor R. That is to say, the current value I varies according to the temperature of the resistor R. Because of this reason, by measuring a relationship between the current value I and the temperature of the resistor R in advance, and making a table TB1 representing this relationship, it is possible to obtain the temperature of the resistor R by obtaining the current value I and using the table TB1. Here, the pixel electrodes 118 forming the resistor R are in contact with the liquid crystal 105, therefore, the obtained temperature of the resistor R represents the temperature of the liquid crystal 105. Consequently, according to the first embodiment, the resistor R functions as a temperature sensor.

The control unit 204 controls the data line driving circuit 160 and the scanning line driving circuit 170, and supplies various kinds of control signals to the data line driving circuit 160 and the scanning line driving circuit 170. Here, after the temperature of the resistor R is obtained, the control unit 204 corrects a video signal according to the obtained temperature, and supplies the corrected video signal to the data line driving circuit 160. The voltage of the video signal determines the gradation of the pixels 110, and the control unit 204 adjusts the voltage of the video signal according to the obtained temperature of the resistor R so that the gradation of the pixels 110 does not vary even if the temperature changes. For example, the voltage of the video signal is corrected to be higher when the temperature is low, and the voltage of the video signal is corrected to be lower when the temperature is high.

Then, a voltage which renders the gradation of the pixels 110 to be at the black level of the normally black mode is applied to the liquid crystal elements 120 in the region a3. Also, a voltage which renders the gradation of the pixels 110 to be at the black level of the normally black mode is applied to the liquid crystal elements 120 in the region a2. Moreover, a voltage which renders the gradation of the pixels 110 to be at the black level of the normally black mode is applied to the liquid crystal elements 120 in the region a12.

Thus, a voltage which renders the gradation of the pixels 110 to be at the black level of the normally black mode is applied to the liquid crystal elements 120 in the region a3, region a2 and region a12. Thereby, the reflectance in each of the region a3, region a2 and region a12 is rendered to be at the black level. Moreover, a voltage which corresponds to an image to be displayed is applied to the liquid crystal elements 120 in the region a11, whereby the reflectance in the region a11 is rendered to correspond to the video signal.

Figure 9:
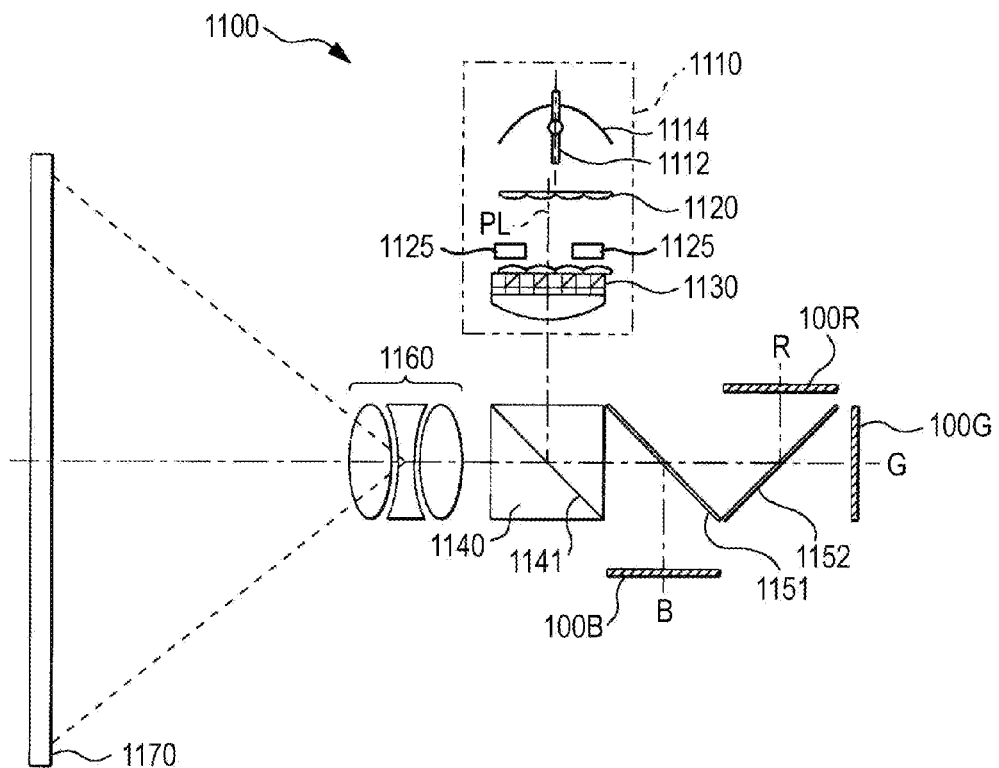
FIG. 9 is a diagram illustrating a configuration of a projector employing the liquid crystal panel.

Next, electronic apparatuses employing the reflective liquid crystal panel 100 according to the aforementioned embodiment will be described. FIG. 9 is a plan view illustrating a configuration of a projector 1100 using the liquid crystal panels 100 as light valves thereof. As illustrated in the drawing, the projector 1100 is configured by including three plates of the reflective liquid crystal panels 100 according to the embodiment, which are arranged to correspond to each color R (red), G (green) and B (blue), respectively. The projector 1100 includes inside thereof a polarized illumination device 1110 arranged along a system light axis PL. In this polarized illumination device 1110, exiting lights from a lamp 1112 are reflected by the reflector 1114 to be substantially parallel light fluxes, and enter a first integrator lens 1120. This first integrator lens 1120 divides the exiting lights from the lamp 1112 into a plurality of intermediate light fluxes. The divided intermediate light fluxes are converted, by a polarization converting element 1130 having a second integrator lens on the light incidence side thereof, to be polarized light fluxes of a single kind (s polarized light flux) substantially aligned in the polarization direction. Thereafter, the converted polarized light fluxes exit from the polarized illumination device 1110.

A diaphragm 1125 adjusts the amount of light coming from the integrator lens 1120 to the polarization converting element 1130, and adjusts the amount of light reaching the liquid crystal panels 100. When the adjustment of the amount of light reaching the liquid crystal panels 100 is performed by the operation button of the projector 1100, the diaphragm 1125 is controlled by a microcomputer for controlling each part of the projector 1100, and adjusts the amount of light passing therethrough.

The s polarized light fluxes exiting from the polarized illumination device 1110 are reflected by an s polarized light flux reflecting surface 1141 of a polarized beam splitter 1140. Out of the reflected light fluxes, a blue light (B) light flux is reflected by a blue light reflecting layer of a dichroic mirror 1151, and modulated by the liquid crystal panel 100B. Out of the light fluxes having passed through the blue light reflecting layer of the dichroic mirror 1151, a red light (R) light flux is reflected by a red light reflecting layer of a dichroic mirror 1152, and modulated by the liquid crystal panel 100R. On the other hand, out of the light fluxes having passed through the blue light reflecting layer of the dichroic mirror 1151, a green light (R) light flux passes through the red light reflecting layer of the dichroic mirror 1152, and is modulated by the liquid crystal panel 100G.

Here, the liquid crystal panels 100R, 100G and 100B are similar to the liquid crystal panel 100 according to the aforementioned embodiment in which each panel is driven by a supplied video signal corresponding to each color R, G, B. That is to say, the projector 1100 includes therein three sets of liquid crystal panels 100 respectively corresponding to the colors R, G, B, and the liquid crystal panels 100 are driven respectively according to video signals corresponding to the colors R, G, B.

The red, green and blue lights respectively modulated by the liquid crystal panels 100R, 100G, 100B are synthesized, in order, by the dichroic mirrors 1152, 1151, and the polarized beam splitter 1140, and thereafter projected on a screen 1170 by an optical system for projection 1160. The light fluxes corresponding to each primary color of R, G, B are directed by the dichroic mirrors 1151, 1152 to be incident to enter the liquid crystal panels 100R, 100B and 100G, which eliminates the need for color filters. As the electronic apparatuses other than the projector described above with reference to FIG. 9, a rear-projection television and a head-mounted display may be exemplified.

According to the aforementioned configuration, the reflectance in each of the region a3, region a2 and region a12 is rendered to be at the black level in the liquid crystal panels 100R, 100G and 100B, whereby these regions are visually recognized as black frames respectively on the screen 1170. In regard to the region a11, the reflectance corresponds to the video signal and an image is displayed accordingly.

Moreover, when the temperature of the liquid crystal element 120 is changed, for example, by the lights exiting from the lamp 1112 and reaching the liquid crystal panels, the resistance value of the resistor R changes and the current value I changes. The control unit 204 obtains the temperature of the resistor R from the signal S1 supplied from the A/D converter 203. That is to say, the temperature of the liquid crystal 105 receiving the light from the lamp 1112 is obtained. When the temperature of the liquid crystal 105 is obtained, the control unit 204 corrects the video signal corresponding to the obtained temperature, and corrects the gradation of an image to be projected on the screen 1170.

According to the configuration of the projector 1100, incident lights to the region a2 are the lights which have been exited from the polarized illumination device 1110 and passed through the polarized beam splitter 1140 and the dichroic mirrors 1151, 1152. Therefore, as compared to a configuration where a temperature sensor is arranged in the region b, the temperature of the liquid crystal 105 can be measured at a position closer to an image-display region. In addition, in the projector 1100, the region a2 is visually recognized as a part of the black frames, so that the temperature of the liquid crystal 105 can be measured without affecting the displayed image.

Figure 10:
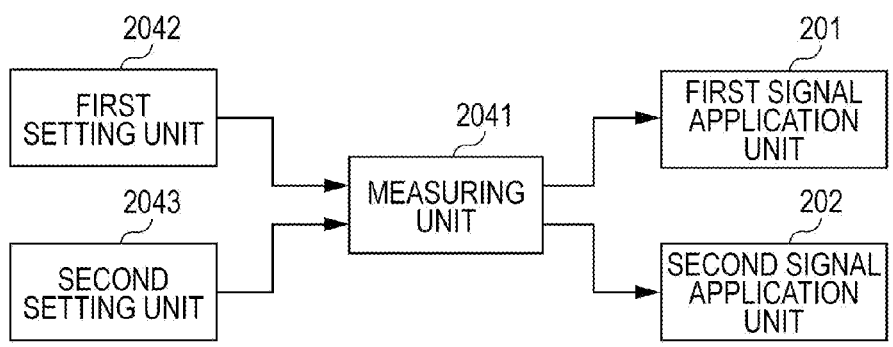
FIG. 10 is a functional block diagram illustrating a configuration of functions for temperature measurement.

Next, the operation of temperature measurement by the control unit 204 will be described. FIG. 10 is a functional block diagram illustrating a configuration of functions for temperature measurement. The first setting unit 2042 is adopted to set a time interval for temperature measurement by the measurement unit 2041, in which the time interval is set to a predetermined first time interval. The second setting unit 2043 is adopted to measure a time interval for temperature measurement by the measurement unit 2041, in which the time interval is set to a second time interval which is longer than the previously-set first time interval. The measurement unit 2041 controls the first signal application unit 201 and the second signal application unit 202, and measures the temperature of the resistor R (that is to say, the temperature of the liquid crystal 105) by using the resistor R which functions as a temperature sensor. Here, the time interval for temperature measurement by the measurement unit 2041 is the time interval set by the first setting unit 2042 or the second setting unit 2043.

Figure 11:
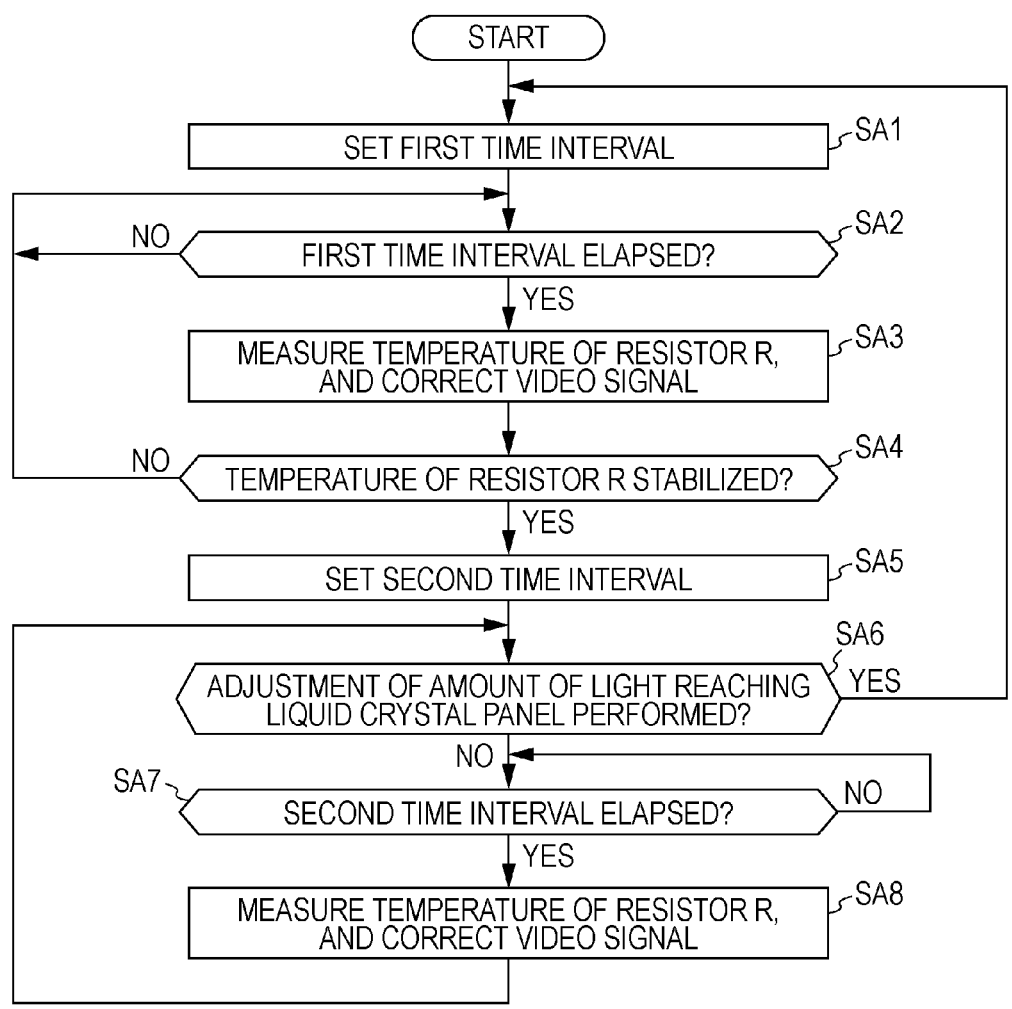
FIG. 11 is a flowchart illustrating a process flow of a control unit.

FIG. 11 is a flowchart illustrating a process flow of the control unit 204. When the projector 1100 is powered on, the control unit 204 sets, to begin with, the time interval for temperature measurement at the first time interval (STEP SA1). According to the first embodiment, the first time interval is set to one second. The control unit 204 counts the first time interval after having set the first time interval, measures the temperature of the resistor R after having counted the first time interval (YES at STEP SA2), and corrects a video signal (STEP SA3). To be more specific, the control unit 204 controls the first signal application unit 201 and the second signal application unit 202, and applies a signal of voltage L Ccom+ voltage Va to the terminal T1 and a voltage L Ccom to the terminal T2. Moreover, as mentioned above, the control unit 204 obtains the current value I from the signal S1, and obtains the temperature of the resistor R by using the table TB1. The obtained temperature is stored in the RAM. After having obtained the temperature, the control unit 204 controls the first signal application unit 201 and the second signal application unit 202, and applies the voltage L Ccom to the terminal T1 and the terminal T2. When the temperature measurement of the resistor R is finished, the control unit 24 corrects, according to the measured temperature, the video signal supplied thereafter to the data line driving circuit 160.

Next, the control unit 204 determines whether or not the temperature of the resistor R is stabilized. To be more specific, the control unit 204 determines whether or not the temperature difference between the last measured temperature stored in the RAM and the temperature measured immediately before the last measured temperature is less than a predetermined threshold value. Herein, as regards the temperature difference, the temperature difference is not limited to that between the last measured temperature and the temperature measured immediately before the last measured temperature. For example, the temperature difference may be that between the last measured temperature and the temperature measured two or more times before the last measured temperature. Here, if the temperature difference is more than the threshold value (NO at STEP SA4), the control unit 204 determines the temperature of the resistor R is not stabilized, and returns the process flow to STEP SA2. On the other hand, if the temperature difference is less than the threshold value (YES at STEP SA4), the control unit 204 sets the time interval for temperature measurement to the second time interval (STEP SA5). According to the first embodiment, the second time interval is set to five seconds that is longer than the first time interval.

Next, the control unit 204 determines whether or not the operation for adjusting the amount of light reaching the liquid crystal panel 100 has been performed by manipulating the operation buttons of the projector 1100. One example of this operation is the brightness adjustment operation, for example, by which the brightness of a video is adjusted to be brighter or darker. Moreover, there is a plurality of modes as video image quality modes, and if each mode has a different video image brightness from the other modes, an operation to change the image quality mode also corresponds to this operation.

When the aforementioned operation has been performed, the projector control unit 205 (for example, a microcomputer) for controlling each part of the projector 1100 outputs to the control unit 204 a signal indicating that the operation has been performed, and the control unit 204 determines, upon receiving the signal, that the operation for adjusting the amount of light reaching the liquid crystal panel 100 has been performed.

If the operation for adjusting the amount of light reaching the liquid crystal panel 100 has not been performed (NO at STEP SA6), the control unit 204 counts the second time interval, and when the second time interval counting is finished (YES at STEP SA7), the control unit 204 measures the temperature of the resistor R similarly to STEP SA3, and corrects the video signal (STEP SA8). In addition, when the temperature measurement of the resistor R is finished, the control unit 204 corrects, according to the measured temperature, the video signal supplied thereafter to the data line driving circuit 160, and returns the process flow to STEP SA6.

On the other hand, when the operation for adjusting the amount of light reaching the liquid crystal panel 100 is performed (YES at STEP SA6), the control unit 204 returns the process flow to STEP SA1, and returns the time interval for temperature measurement to the first time interval.

According to the first embodiment, the resistor R, that is to say, the pixel electrodes 118 forming the pixels 110 in the region a2 and the wiring connecting these pixel electrodes 118 are fed with an electric current only when the temperature is to be obtained. Consequently, the probability of occurrence of electromigration is low, and the resistor R can be used for a long period of time as a temperature measurement element. Further, according to this embodiment, the time interval for obtaining the temperature is changed according to temperature changes, and the time period for feeding a current to the resistor R is shortened when the temperature change is less than the threshold value. Consequently, the probability of occurrence of electromigration is low, and the resistor R can be used for a long period of time as a temperature measurement element.

Second Embodiment

Next, the second embodiment of the invention will be described. According to the second embodiment, the liquid crystal panel 100 has the same hardware configuration as the one according to the first embodiment, but the voltage applied to the terminal T1 differs from that of the first embodiment.

Figure 12:
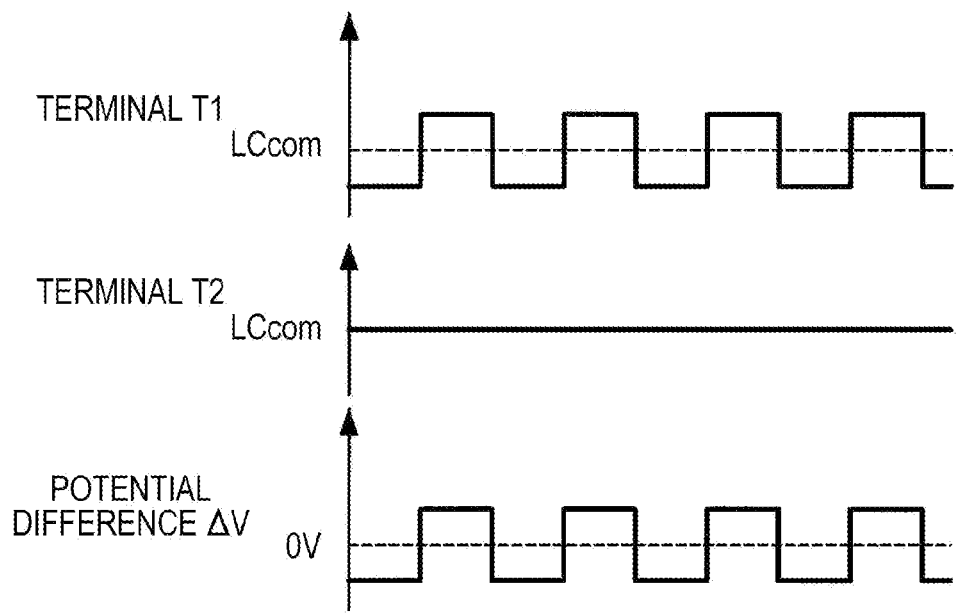
FIG. 12 is a diagram illustrating a voltage to be applied to a pixel electrode for temperature measurement according to the second embodiment.

FIG. 12 is a diagram illustrating a voltage applied to a terminal T1 by a first signal application unit 201 according to the second embodiment, a voltage applied to a terminal T2 by a second signal application unit 202 according to the second embodiment, and a potential difference ΔV between the terminal T1 and the terminal T2 according to the second embodiment, during measurement of temperature. As shown in FIG. 12, a positive voltage and a negative voltage with respect to the voltage L Ccom are applied to the terminal T1 alternately. Moreover, the voltage L Ccom is applied to the terminal T2 similarly to the first embodiment. If a voltage is thus applied to the terminal T1 and the terminal T2, the potential difference between the terminal T1 and the terminal T2 alternates between the positive polarity and the negative polarity as shown in FIG. 12. According to the second embodiment, too, a voltage which renders the gradation of the pixels 110 to be at the black level of the normally black mode is applied to the liquid crystal elements 120 in the region a2.

The control unit 204 obtains a current value I and obtains the absolute value of the obtained current value I. Moreover, the control unit 204 obtains the temperature of the resistor R by using the absolute value of the obtained current value I and the table TB1, and corrects the video signal corresponding to the obtained temperature.

According to the second embodiment, a voltage having the positive polarity and a voltage having the negative polarity are applied with respect to the liquid crystal elements 120 in the region a2 with voltage L Ccom being set as the medium voltage therebetween. Consequently, the liquid crystal elements 120 in the region a2 can be prevented from being applied with a direct current component.

Third Embodiment

Next, the third embodiment of the invention will be described. According to the third embodiment, the liquid crystal panel 100 has the same hardware configuration as the one according to the first embodiment, but the voltage applied to the terminal T1 and the voltage applied to the terminal T2 differ from those of the first embodiment.

Figure 13:
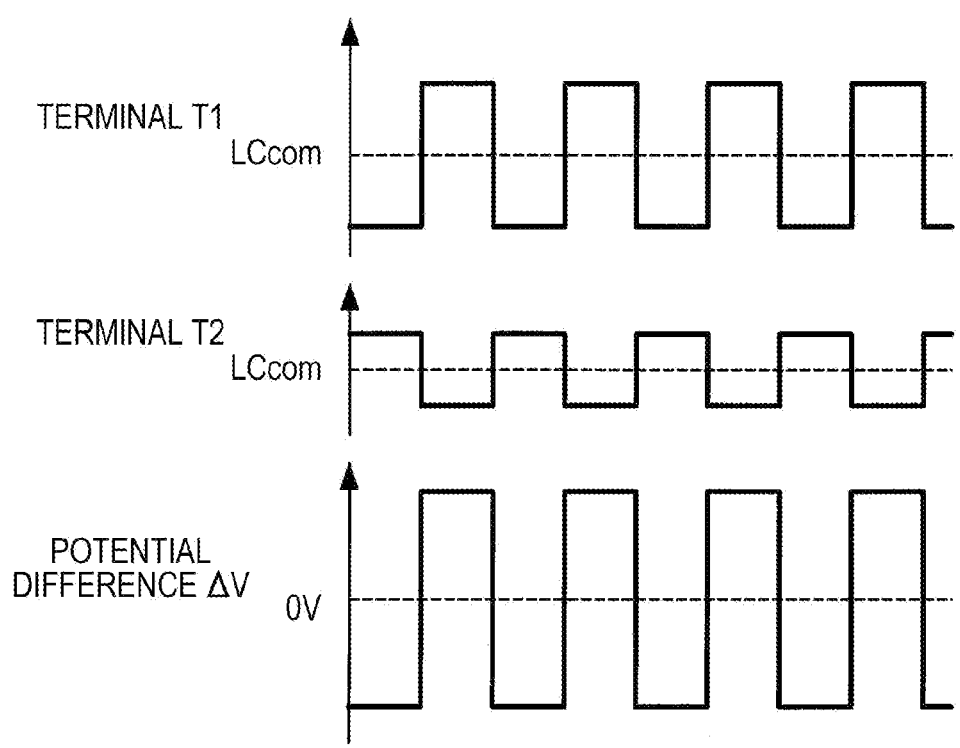
FIG. 13 is a diagram illustrating a voltage to be applied to a pixel electrode for temperature measurement according to the third embodiment.

FIG. 13 is a diagram illustrating a voltage applied to a terminal T1 by a first signal application unit 201 according to the third embodiment, a voltage applied to a terminal T2 by a second signal application unit 202 according to the third embodiment, and a potential difference ΔV between the terminal T1 and the terminal T2 according to the third embodiment, during measurement of the temperature. As shown in FIG. 13, the terminal T1 is applied alternately with a positive voltage and a negative voltage with respect to the voltage L Ccom. Also, the terminal T2 is applied alternately with a positive voltage and a negative voltage with respect to the voltage L Ccom.

According to the third embodiment, the voltage applied to the terminal T1 and the voltage applied to the terminal T2 differ from each other in amplitude such that the amplitude of the voltage applied to the terminal T1 is larger than the amplitude of the voltage applied to the terminal T2. Moreover, according to the third embodiment, during the period when a higher voltage than the voltage L Ccom is applied to the terminal T1, a lower voltage than the voltage L Ccom is applied to the terminal T2, and during the period when a lower voltage than the voltage L Ccom is applied to the terminal T1, a higher voltage than the voltage L Ccom is applied to the terminal T2.

If the terminal T1 and the terminal T2 thus have voltages applied thereto respectively, the potential difference between the terminal T1 and the terminal T2 alternates between the positive polarity and the negative polarity as shown in FIG. 13. According to the third embodiment, also, a voltage which renders the gradation of the pixels 110 to be at the black level of the normally black mode is applied to the liquid crystal elements 120 in the region a2.

The control unit 204 obtains a current value I and obtains the absolute value of the obtained current value I. Moreover, the control unit 204 obtains the temperature of the resistor R by using the absolute value of the obtained current value I and the table TB1, and corrects the video signal corresponding to the obtained temperature.

According to the third embodiment, a voltage having the positive polarity and a voltage having the negative polarity are applied with respect to the liquid crystal elements 120 in the region a2 with voltage L Ccom being set as the medium voltage therebetween. Consequently, the liquid crystal elements 120 in the region a2 can be prevented from being applied with a direct current component. Moreover, according to the third embodiment, the potential difference ΔV can be increased to be larger as compared with the cases of the first embodiment and the second embodiment, so that the accuracy of measurement of the current value I can be improved.

Figure 14:
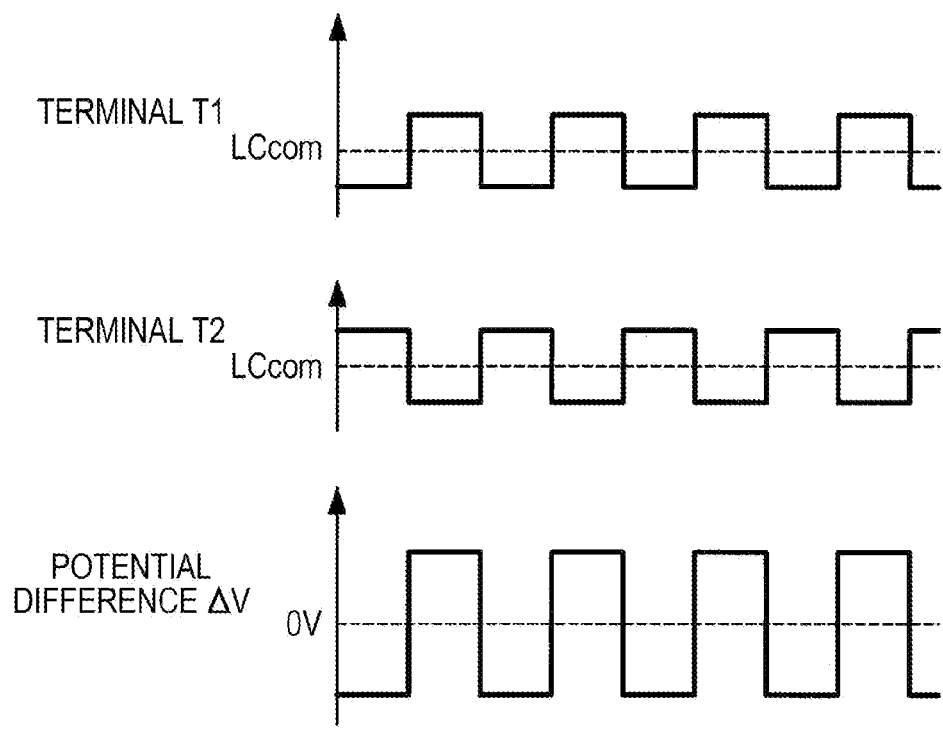
FIG. 14 is a diagram illustrating a voltage to be applied to a pixel electrode for temperature measurement according to a modified example of the third embodiment.

According to the third embodiment, the amplitude of the voltage applied to the terminal T1 and the amplitude of the voltage applied to the terminal T2 differ from each other. As shown in FIG. 14, however, the amplitude of the voltage applied to the terminal T1 and the amplitude of the voltage applied to the terminal T2 may be set to be the same.

Fourth Embodiment

Next, the fourth embodiment of the invention will be described. According to the fourth embodiment, the liquid crystal panel 100 has the same hardware configuration as the one according to the first embodiment, but the voltage applied to the terminal T1 and the voltage applied to the terminal T2 differ from those of the first embodiment.

Figure 15:
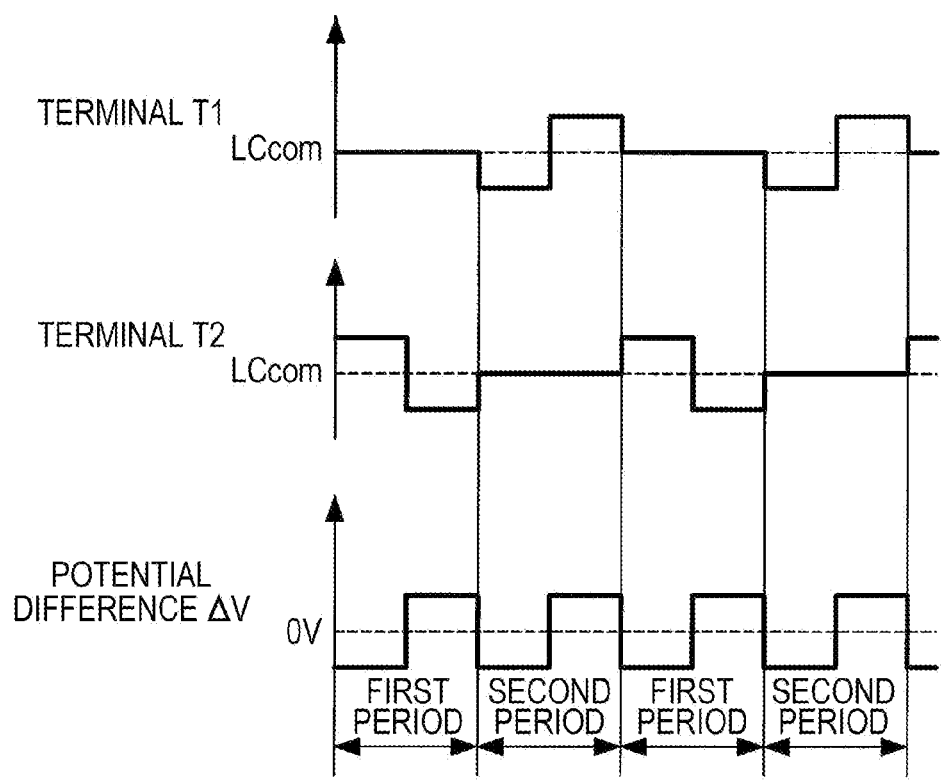
FIG. 15 is a diagram illustrating a voltage to be applied to a pixel electrode for temperature measurement according to the fourth embodiment.

FIG. 15 is a diagram illustrating a voltage applied to the terminal T1 by the first signal application unit 201 according to the fourth embodiment, a voltage applied to the terminal T2 by the second signal application unit 202 according the fourth embodiment, and a potential difference ΔV between the terminal T1 and the terminal T2 according to the fourth embodiment, during measurement of temperature. As shown in FIG. 15, according to the fourth embodiment, there are two periods for applying a voltage to the terminal T1 and the terminal T2, namely, a first period and a second period. The first period and the second period are the same in length, and come in turn alternately.

To begin with, in the first period, the voltage L Ccom is applied to the terminal T1, and a positive voltage with respect to the voltage L Ccom and thereafter a negative voltage with respect to the voltage L Ccom are applied to the terminal T2. In the second period, the voltage L Ccom is applied to the terminal T2, and a negative voltage with respect to the voltage L Ccom and thereafter a positive voltage with respect to the voltage L Ccom are applied to the terminal T1.

If a voltage is thus applied to the terminal T1 and the terminal T2, the potential difference between the terminal T1 and the terminal T2 alternates between the positive polarity and the negative polarity as shown in FIG. 15. According to the fourth embodiment, also, a voltage which renders the gradation of the pixels 110 to be at the black level of the normally black mode is applied to the liquid crystal elements 120 in the region a2.

The control unit 204 obtains a current value I and obtains the absolute value of the obtained current value I. Moreover, the control unit 204 obtains the temperature of the resistor R by using the absolute value of the obtained current value I and the table TB1, and corrects the video signal corresponding to the obtained temperature.

According to the fourth embodiment, a voltage having the positive polarity and a voltage having the negative polarity are applied with respect to the liquid crystal elements 120 in the region a2 with voltage L Ccom being set as the medium voltage therebetween. Consequently, the liquid crystal elements 120 in the region a2 can be prevented from being applied with a direct current component.

Modified Examples

The embodiments of the invention have so far been described. However, without being limited to the aforementioned embodiments, the invention can also be implemented in other various ways. For example, the invention can be implemented by modifying the aforementioned embodiments as will be described hereinbelow, or by combining each of the modified embodiments.

Figure 16:
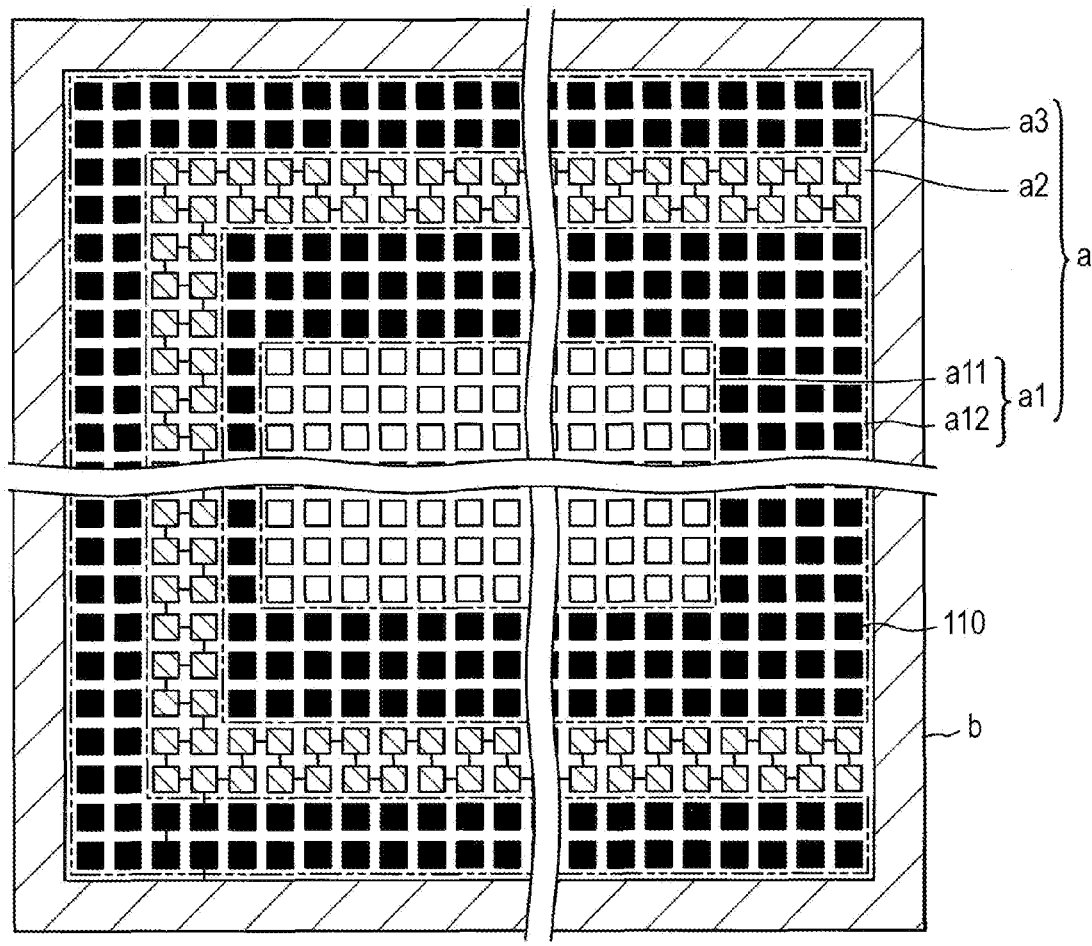
FIG. 16 is a diagram illustrating regions formed in a liquid crystal panel according to a modified example.

According to the aforementioned embodiments, the pixels 110 in the region a2 are aligned in one line only, but as illustrated in FIG. 16, the pixels 110 may be aligned in two lines in the region a2. According to such a configuration, as indicated by solid lines in FIG. 16, the pixel electrodes 118 of the pixels 110 in the region a2 may be formed to be a single resistor by connecting the pixel electrodes 118 of the pixels 110 in the region a2 to align in one line.

Figure 17:
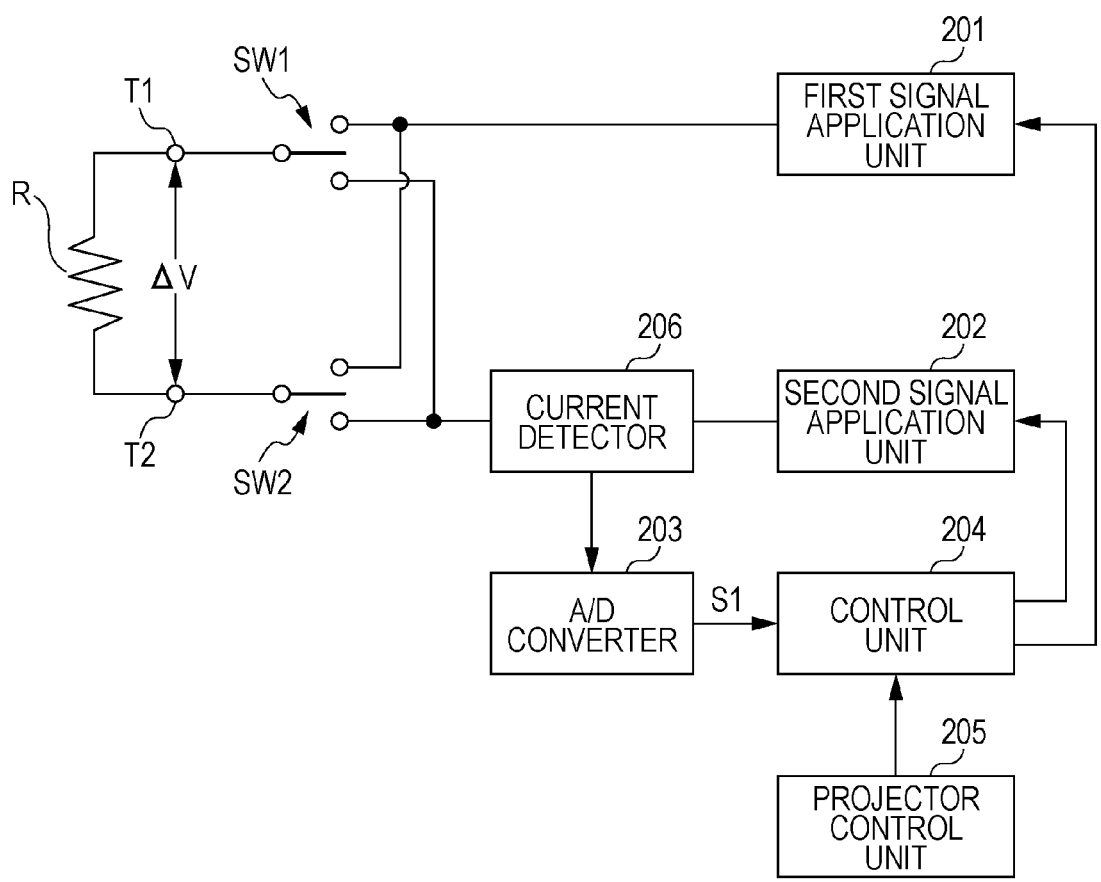
FIG. 17 is a diagram illustrating a configuration of hardware for measuring the temperature of a liquid crystal element according to a modified example.

According to the second embodiment of the invention, as shown in FIG. 17, a switch SW1 for connecting the terminal T1 to the first signal application unit 201 or the second signal application unit 202, and a switch SW2 for connecting the terminal T2 to the first signal application unit 201 or the second signal application unit 202 may be provided.

Furthermore, the configuration illustrated in FIG. 17 may be so modified that before an electronic apparatus including the liquid crystal panel 100 is powered on to display an image on the panel, that is, to be more specific, before a supply of a video signal to the data line driving circuit 160 starts, the switch SW1 and the switch SW2 are so controlled as to connect the terminal T1 and the terminal T2 to the second signal application unit 202 thereby applying the voltage L Ccom to the resistor R, and at the time the supply of a video signal to the data line driving circuit 160 starts, the switch SW1 may be so controlled as to connect the terminal T1 to the first signal application unit 201. Moreover, the configuration illustrated in FIG. 17 may be so modified that when an electronic apparatus including the liquid crystal panel 100 is powered off and finishes the operations of the data line driving circuit 160 and the scanning line driving circuit 170, that is, to be more specific, when the supply of a video signal to the data line driving circuit 160 finishes, the switch SW1 and the switch SW2 are connected to the second signal application unit 202 thereby applying the voltage L Ccom to the resistor R.

According to the aforementioned embodiments, the pixels 110 in the region a12 are configured the same as the pixels 110 in the region a11, so that they can display not only black but an image. Consequently, in regard to the liquid crystal elements 120 on the inner side of the region a2, the position of the region a11 may be changed by changing the destination of a data signal which renders the gradation to be at the black level. Changing the position of the region a11 enables changes to the widths of the vertical and horizontal sides of a part visually recognized as a black frame defined by the region a3, region a2 and region a12, and to change the position of the effective display region.

According to the aforementioned embodiments, the liquid crystal 105 is in the normally black mode, but the liquid crystal 105 may be rendered to be in a normally white mode, for example, as a TN type, where the pixels 110 are in a white state when no voltage is applied thereto. In this case, as the voltage applied to the liquid crystal elements 120 increases higher, the transmittance of light decreases accordingly, therefore, the voltage is applied to the regions a3, region a2 and region a12 in such a manner that these regions are displayed in black.

Moreover, according to the aforementioned embodiments, the liquid crystal panel 100 is a reflection type, but the liquid crystal panel 100 may be a transmission type.

According to the aforementioned embodiments, the region a2 may be arranged on the outermost side of the region a, without the region a3.

According to the aforementioned embodiments, the first time interval is one second and the second time interval is five seconds, but without being limited to these time lengths, the first time interval and the second time interval may each take another time interval as long as the first time interval is shorter than the second time interval. Moreover, according to the aforementioned embodiments, the time interval for temperature measurement is set to the first time interval or the second time interval, but a third time interval which is longer than the second time interval may be further set.

Figure 18:
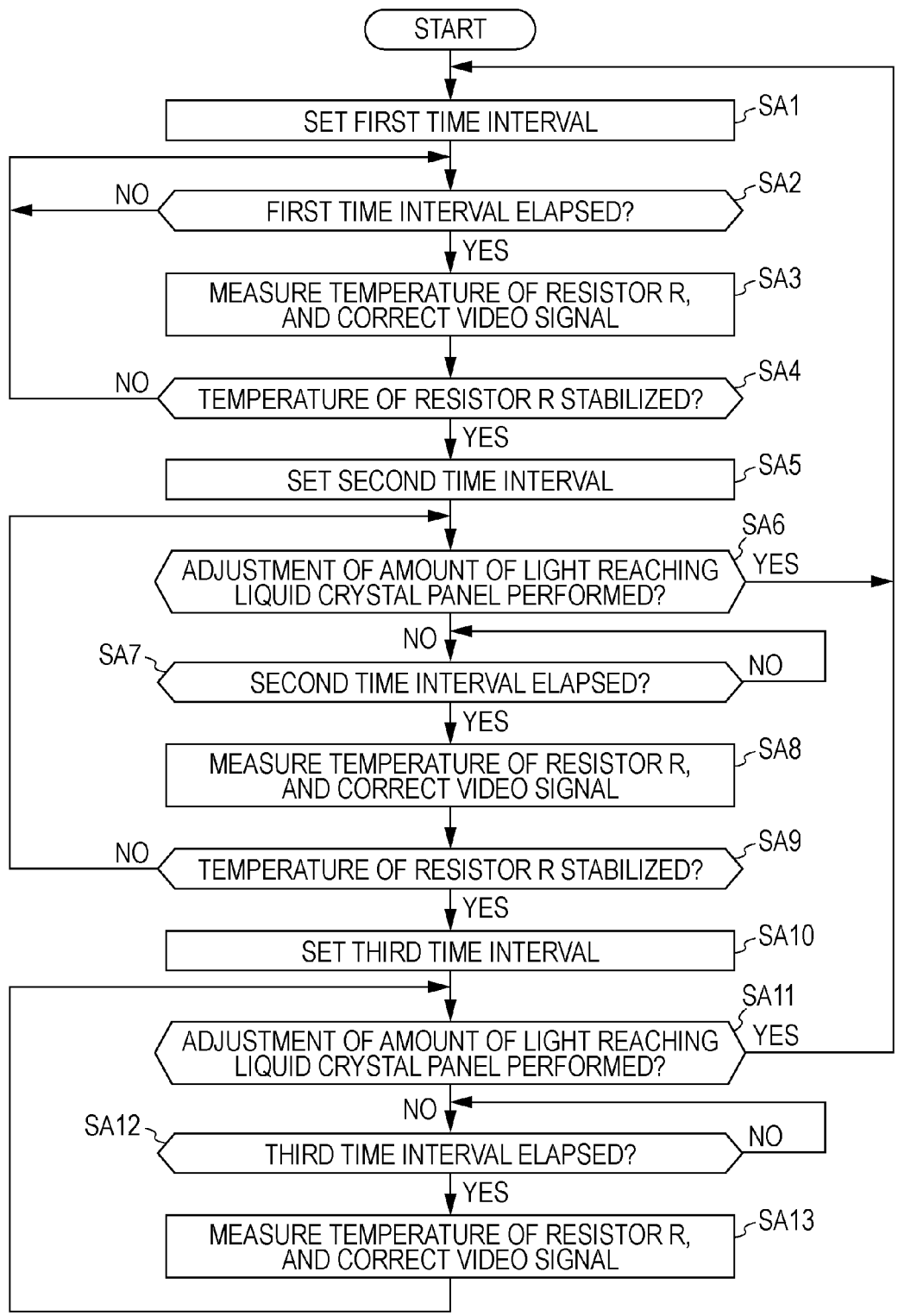
FIG. 18 is a flowchart illustrating a process flow of a control unit.
Figure 19:
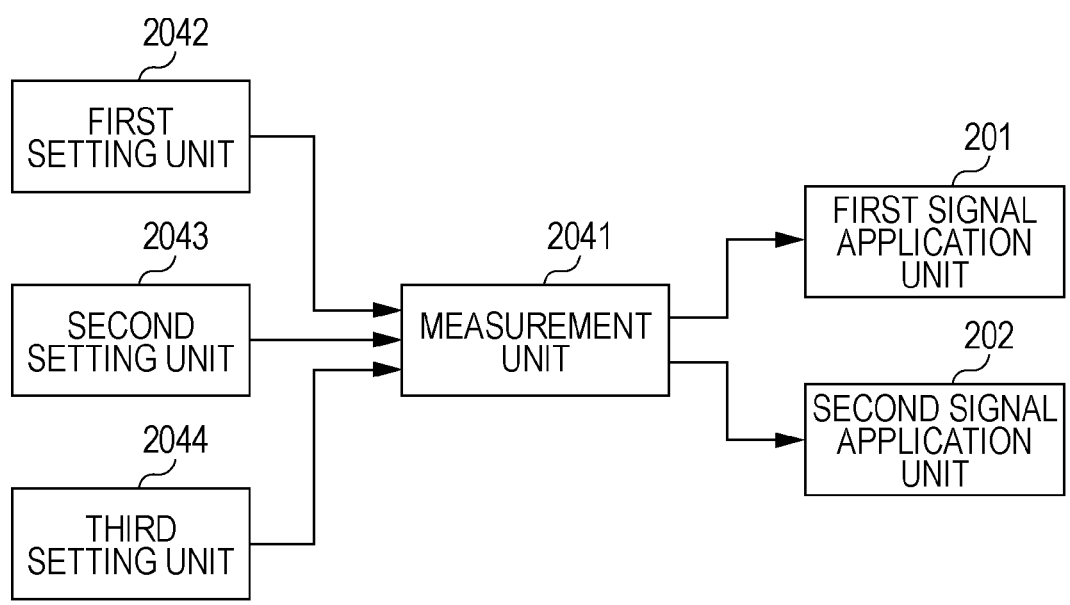
FIG. 19 is a functional block diagram illustrating a configuration of functions according to a modified example.

FIG. 18 is a flowchart showing the process flow performed by the control unit 204 according to the modified example of the invention. Moreover, FIG. 19 is a functional block diagram showing a configuration of functional units according to the modified example. As shown in FIG. 19, according to the modified example, a third setting unit 2044 is provided. The third setting unit 2044 sets a time interval for temperature measurement by the measurement unit 2041, that is to say, the unit 2044 sets a third time interval which is longer than the predetermined second time interval.

Next, the operation according to the modified example will be described with reference to FIG. 18. Here, in the flowchart of FIG. 18, the processes from STEP SA1 to STEP SA8 are the same as those according to the aforementioned embodiments, therefore, respective descriptions thereof will be omitted.

According to the aforementioned embodiments, when the process at STEP SA8 is finished, the process flow is returned to STEP SA6, but according to the modified example, the control unit 204 determines whether or not the temperature of the resistor R is stabilized at STEP SA9. Here, it is determined whether or not the temperature difference between the last measured temperature and the temperature measured before the last measured temperature, each stored in the RAM, is less than a predetermined threshold value. Herein, the threshold value at STEP SA9 is set to be smaller than that at STEP SA4.

If the temperature difference is more than the threshold value (NO at STEP SA9), the control unit 204 returns the process flow to STEP SA6. On the other hand, if the temperature difference is less than the threshold value (YES at STEP SA9), the control unit 204 sets the time interval for temperature measurement to the third time interval (STEP SA10). Here, at STEP SA10 according to the modified example, the third time interval is set to ten seconds, which is longer than the second time interval.

Next, the control unit 204 determines whether or not the operation to adjust the amount of light reaching the liquid crystal panel 100 has been performed. If the operation to adjust the amount of light reaching the liquid crystal panel 100 has not been performed (NO at STEP SA11), the control unit 204 counts the third time interval, and after having counted the third time interval (YES at STEP SA12), measures the temperature of the resistor R in the same manner as in STEP SA3, and corrects the video signal (STEP SA13). After having finished the temperature measurement of the resistor R, the control unit 204 corrects, corresponding to the measured temperature, the video signal supplied to the data line driving circuit 160 thereafter, and returns the process flow to STEP SA11.

On the other hand, when the operation to adjust the amount of light reaching the liquid crystal panel 100 has been performed (YES at STEP SA11), the control unit 204 returns the process flow to STEP SA1, and returns the time interval for temperature measurement to the first time interval.

According to the modified example, the temperature measurement interval is longer than the temperature measurement interval according to the aforementioned embodiments, so that the probability of occurrence of electromigration is low, and the resistor R can be used for a long period of time as a temperature measurement element.

According to the aforementioned embodiments, the pixel electrodes 118 and the wiring connecting these pixel electrodes are used as the temperature sensor, but the configuration for temperature measurement is not limited to the configuration according to the aforementioned embodiments. For example, a thermistor may be arranged in the region of the light blocking layer 109 as a temperature sensor, thereby to perform the temperature measurement by using this thermistor. Moreover, the temperature sensor may be a resistor arranged within the display region.

According to the aforementioned embodiments, the video signal is corrected corresponding to the measured temperature, but a cooling fan for cooling the liquid crystal panel 100 may also be provided here such that, corresponding to the measured temperature, the switching on/off of the cooling fan and the rotational frequency of the cooling fan are controlled.

The control unit 204, the first signal application unit 201, the second signal application unit 202 and the A/D converter 203 may be configured to be arranged in the liquid crystal panel 100. Moreover, the control unit 204, the first signal application unit 201, the second signal application unit 202 and the A/D converter 203 may be collectively configured as a temperature detecting device, so that this temperature detecting device can be arranged not in the liquid crystal panel 100 but in an electronic apparatus employing the liquid crystal panel 100.

According to the aforementioned embodiments, the liquid crystal panel is employed, but an electronic apparatus including a light emitting element having a temperature dependency as luminance efficiency with respect to a drive current corresponding to a video signal, for example, an electroluminescent element, may be employed.

This application claims priority to Japan Patent Application No. 2011-004592 filed Jan. 13, 2011, the entire disclosures of which are hereby incorporated by reference in their entireties.

What is claimed is:

1. An electro-optic device comprising:
   a temperature sensor that includes a plurality of dummy pixel electrodes electrically interconnected to each other on an outside of a display region for displaying an image;
   a measurement unit that measures a temperature by applying, at a set time interval, a signal for actuating the temperature sensor to the temperature sensor through a wiring;
   a first setting unit that sets the set time interval as a second time interval which is longer than a first time interval, if a difference between a latest temperature measured by the measurement unit and a previous temperature measured by the measurement unit at a time period preceding the latest temperature is less than a first predetermined threshold value as determined by a control unit, when the measurement unit measures the temperature at the first time interval; and
   a second setting unit that sets the set time interval as the first time interval, if an amount of incident light from a light source is changed when the measurement unit measures the temperature at the second time interval.

2. The electro-optic device according claim 1, further comprising:
   a third setting unit that sets the set time interval as a third time interval that is longer than the second time interval, if a difference between a last measured temperature measured by the measurement unit and a temperature measured before the last measured temperature measured by the measurement unit is less than a second threshold value which is smaller than the first threshold value as determined by the control unit, when the measurement unit measures a temperature at the second time interval.

3. An electronic apparatus comprising an electro-optic device according to claim 1.

4. An electronic apparatus comprising an electro-optic device according to claim 2.

* * * * *